(12) United States Patent
Wirola et al.

(10) Patent No.: US 10,111,048 B2
(45) Date of Patent: *Oct. 23, 2018

(54) 3D SECTORIZED PATH-LOSS MODELS FOR 3D POSITIONING OF MOBILE TERMINALS

(71) Applicant: HERE Global B.V., Eindhoven (NL)

(72) Inventors: Lauri Wirola, Tampere (FI); Jari Syrjarinne, Tampere (FI); Elena-Simona Lohan, Tampere (FI); Jukka Talvitie, Tampere (FI)

(73) Assignee: HERE Global B.V., Eindhoven (NL)

(*) Notice: Subject to any disclaimer, the term of this patent is extended or adjusted under 35 U.S.C. 154(b) by 0 days.

This patent is subject to a terminal disclaimer.

(21) Appl. No.: 15/845,010

(22) Filed: Dec. 18, 2017

(65) Prior Publication Data

US 2018/0109925 A1 Apr. 19, 2018

Related U.S. Application Data

(63) Continuation of application No. 14/909,642, filed as application No. PCT/EP2014/065572 on Jul. 21, 2014, now Pat. No. 9,883,352.

(30) Foreign Application Priority Data

Aug. 16, 2013 (GB) .................................. 1314663.4

(51) Int. Cl.
*H04W 36/00* (2009.01)
*H04W 4/04* (2009.01)
(Continued)

(52) U.S. Cl.
CPC ........... *H04W 4/043* (2013.01); *G01S 5/0252* (2013.01); *H04W 4/029* (2018.02)

(58) Field of Classification Search
CPC ....... H04W 64/00; H04W 4/02; H04W 4/025; H04W 16/24; H04W 64/003; H04W 4/04;
(Continued)

(56) References Cited

U.S. PATENT DOCUMENTS 9,213,083 B1 12/2015 Carter et al.
9,883,352 B2* 1/2018 Wirola .................. H04W 4/043
(Continued)

FOREIGN PATENT DOCUMENTS

CN 102215497 A 10/2011
CN 102984745 A 3/2013
(Continued)

OTHER PUBLICATIONS

German Office Action for German Application No. 102016212421.8, dated May 28, 2017, with English Translation.
(Continued)

*Primary Examiner* — Nimesh Patel
(74) *Attorney, Agent, or Firm* — Lempia Summerfield Katz LLC

(57) ABSTRACT

A method performed by an apparatus is disclosed. The method comprises obtaining position information on a position and received signal strength information representative of a strength of a signal from a communication node receivable at the position. The method further comprises generating or updating a 3D sectorized path-loss model associated with the communication node at least based on the position information and the received signal strength information, wherein the position information and the received signal strength information are used to generate or update one or more path-loss parameters for a 3D sector of a set of one or more 3D sectors of the 3D sectorized path-loss model in which 3D sector the position is located. Furthermore, a method performed by an apparatus is dis-
(Continued)

closed, the method comprising, at least one of storing, providing or obtaining information on or derived from a 3D sectorized path-loss model associated with a communication node, the 3D sectorized path-loss model comprising one or more 3D sectors with one or more respective path-loss parameters, the information on or derived from the 3D sectorized path-loss model useable, together with received signal strength information representative of a strength of a signal received from the communication node by a device, in a process of determining an estimate of a position of the device. According apparatuses, computer programs and computer readable media storing such computer programs are disclosed.

20 Claims, 9 Drawing Sheets

(51) Int. Cl.
*H04W 4/029* (2018.01)
*G01S 5/02* (2010.01)

(58) Field of Classification Search
CPC ... H04W 52/04; H04W 52/283; H04W 4/028; H04W 16/18; H04W 24/10; H04W 52/244; H04W 16/06; H04W 16/28; H04W 36/30; H04W 4/021; H04W 8/08; H04W 8/10; H04W 24/00; H04W 4/023; H04W 52/06; H04W 72/082; G01S 5/0252; G01S 11/06; G01S 5/10; G01S 3/30; G01S 5/14; G01S 5/0226
See application file for complete search history.

(56) References Cited

U.S. PATENT DOCUMENTS

| 2004/0166887 | A1 | 8/2004 | Laroia et al. |
| 2006/0240843 | A1 | 10/2006 | Spain et al. |
| 2008/0287056 | A1 | 11/2008 | van de Groenendaal |
| 2013/0028131 | A1 | 1/2013 | Davidson et al. |
| 2014/0187259 | A1* | 7/2014 | Kakani ............... H04W 64/00 455/456.1 |

FOREIGN PATENT DOCUMENTS

| CN | 103118333 A | 5/2013 |
| WO | WO2012074379 | 6/2012 |
| WO | WO2013065042 | 5/2013 |
| WO | WO2014000090 | 1/2014 |

OTHER PUBLICATIONS

Chinese Office Action for related Chinese Application No. 2014 800 455 24.0 dated Jan. 24, 2017, with English Translation.
Chinese Office Action for related Chinese Application No. 201480045524.0 dated Oct. 9, 2017, with English Translation.
International Search Report and Written Opinion cited in PCT/EP2014/065572, dated Sep. 29, 2014.
European Office Action for European Patent Application No. 14741316.5-1218, dated Mar. 27, 2018.
Chinese Office Action for Chinese Application No. 201580045524.0, dated Apr. 4, 2018.

* cited by examiner

3D SECTORIZED PATH-LOSS MODELS FOR 3D POSITIONING OF MOBILE TERMINALS

This application is a continuation under 37 C.F.R. § 1.53(b) and 35 U.S.C. § 120 of U.S. patent application Ser. No. 14/909,642, filed Feb. 2, 2016, which was filed under 35 U.S.C. 371 claiming benefit of PCT Application No. PCT/EP2014/065572, filed on Jul. 21, 2014, which claims the benefit of GB 1314663.4, filed on Aug. 16, 2013, the contents of each of which are incorporated herein by reference.

FIELD OF THE DISCLOSURE

The invention relates to the field of positioning of mobile terminals, and more specifically to path-loss models to be used in positioning mobile terminals in a three-dimensional (3D) space such as for instance a building.

BACKGROUND

Mobile terminal positioning methods that are based on positions of Wireless Local Area Network (WLAN) access points suit particularly well for indoor positioning due to the global existence of WLAN connectivity in buildings. Moreover, such methods are easily scalable, because additional infrastructure is needed only on the server side in order to compute the location estimation, for instance in the form of servers providing radiomaps (e.g. maps indicating at which positions access points can be observed) and/or positioning services.

Indoor mobile positioning can for example be done based on WLAN Received Signal Strengths (RSS) collected at different floors inside the buildings. There are typically two stages in WLAN-based positioning:

First, the training phase or data collection stage, where the data is collected in the form of so-called fingerprints, which contain location estimate (e.g., if available, based on a Global Navigation Satellite System (GNSS), sensor-based, WLAN-based, manually inputted, etc.) and the measurements taken from the radio interface(s) at the respective location. The training can for example be a continuous background process, in which mobile terminals are continuously reporting measured data to the server or learn their internal offline radiomap.

Second, the estimation/positioning phase or data estimation phase, where the mobile terminal estimates its current location based on the data available from the training phase.

The measurements collected and stored in the training phase may for example contain (specifically in the WLAN case):
  Signal strengths (for example, RSS index, physical Rx level in dBm ref 1 mW, etc.)
  Basic Service Set IDs (BSSIDs) (e.g. Medium Access Control (MAC) addresses) of the WLAN access points observed and, possibly,
  Service Set IDs (SSIDs)
  timing measurements (Round-Trip Time)

This measurement data gets uploaded/reported to the server or cloud, where algorithms are run to generate models of the WLAN access points for positioning purposes. Such models may be coverage areas, node positions, radio propagation models (e.g. path-loss models), etc. In the end, these models or parts of them are transferred back to the mobile terminals for use in position determination (terminal-based positioning). Alternatively, the models may be stored in a positioning server to which the mobile terminals connect as clients for position information (terminal-assisted positioning).

SUMMARY OF SOME EXAMPLE EMBODIMENTS OF THE INVENTION

Indoor positioning is inherently a 3D positioning problem due to the existence of floors. While outdoors in many use cases it suffices to express latitude and longitude, indoors also the altitude information (floor) is required in order to be able to, say, display the floor plan for the correct floor. While 2D indoor localization via RSS has been thoroughly addressed so far, the 3D modeling of the wireless environment in terms of RSS is still an open issue.

As an example embodiment of the present invention, a method performed by an apparatus is disclosed, the method comprising:
  obtaining position information on a position and received signal strength information representative of a strength of a signal from a communication node receivable at the position; and
  generating or updating a 3D sectorized path-loss model associated with the communication node at least based on the position information and the received signal strength information, wherein the position information and the received signal strength information are used to generate or update one or more path-loss parameters for a 3D sector of a set of one or more 3D sectors of the 3D sectorized path-loss model in which 3D sector the position is located.

As a further example embodiment of the present invention, a further method is disclosed, the method comprising:
  at least one of storing, providing or obtaining information on or derived from a 3D sectorized path-loss model associated with a communication node, the 3D sectorized path-loss model comprising one or more 3D sectors with one or more respective path-loss parameters, the information on or derived from the 3D sectorized path-loss model useable, together with received signal strength information representative of a strength of a signal received from the communication node by a device, in a process of determining an estimate of a position of the device.

For both methods, according apparatuses configured to perform these methods or comprising means for performing these methods, computer programs causing an apparatus to perform these methods when executed on a processor and tangible computer-readable media storing such computer programs are disclosed.

Embodiments of the invention allow to generate or update a 3D sectorized path-loss model from a plurality of fingerprints. The 3D sectorized path-loss model is sector-oriented in that path-loss parameters are for instance determined for each 3D sector. This takes into account the different propagation characteristics of signals emitted from a communication node in different directions (e.g. in one direction, there may be an attenuating wall, while another direction, there may be a corridor basically allowing for much less attenuated free-space propagation). In example embodiments, the position indicated by the position information received in the fingerprints is first assigned to one or more 3D sectors, and then, for each 3D sector, position information and received signal strength information pertaining to a plurality of positions is processed to determine path-loss parameters (e.g. an assumed transmission power of the communication node and a path-loss coefficient of a logarithmic path-loss model) for the 3D sectors, for example by a curve fitting procedure. Path-loss parameters of one or more 3D sectors of 3D sectorized path-loss models for one or more communication nodes or information derived from these path-loss parameters (e.g. a 3D received signal strength grid for each communication node) may then be used to determine an estimate of a position for which received signal strength information with respect to the one or more communication nodes is available.

Embodiments of the invention are used for indoor positioning, for instance for WLAN access points as communication nodes (here assumed to be non-cellular communication nodes). Equally well, embodiments of the invention may be applied to 3D positioning in a cellular communication network with base stations as communication nodes. 3D sectorized path-loss models may also be generated and/or updated for a mixture of cellular and non-cellular communication nodes.

It is to be understood that the presentation of embodiments of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF EXAMPLE EMBODIMENTS OF THE INVENTION

Figure 1A:
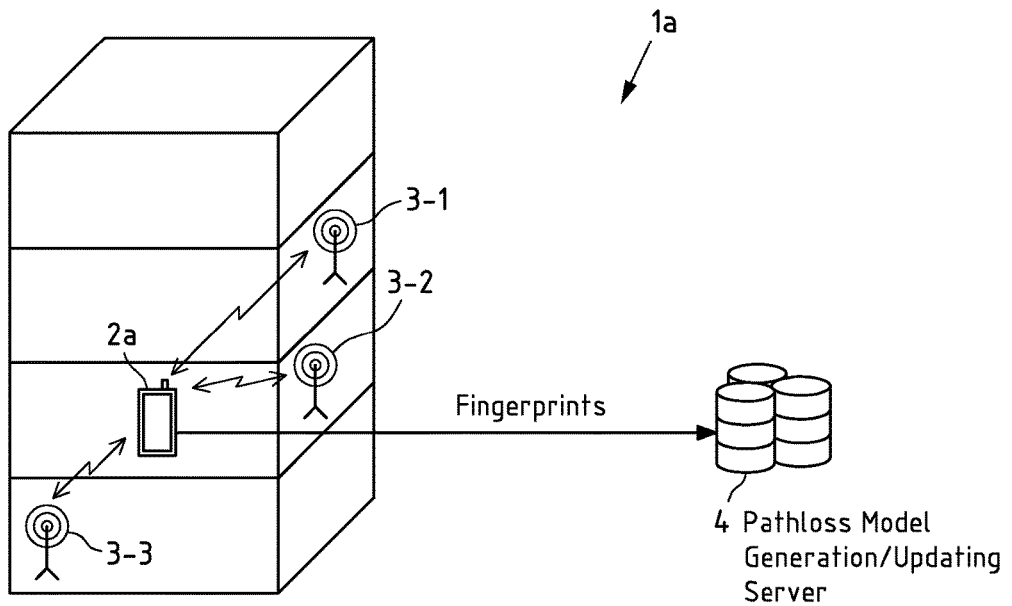
FIGS. 1a-1c are schematic illustrations of positioning systems in which example embodiments of apparatuses according to the present invention are deployed.
Figure 1B:
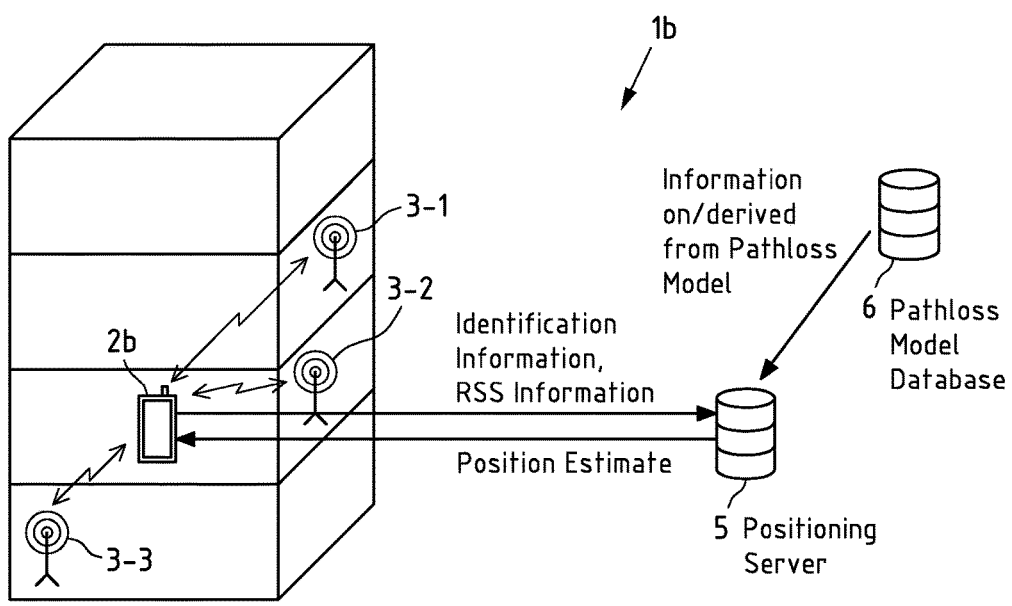
Figure 1C:
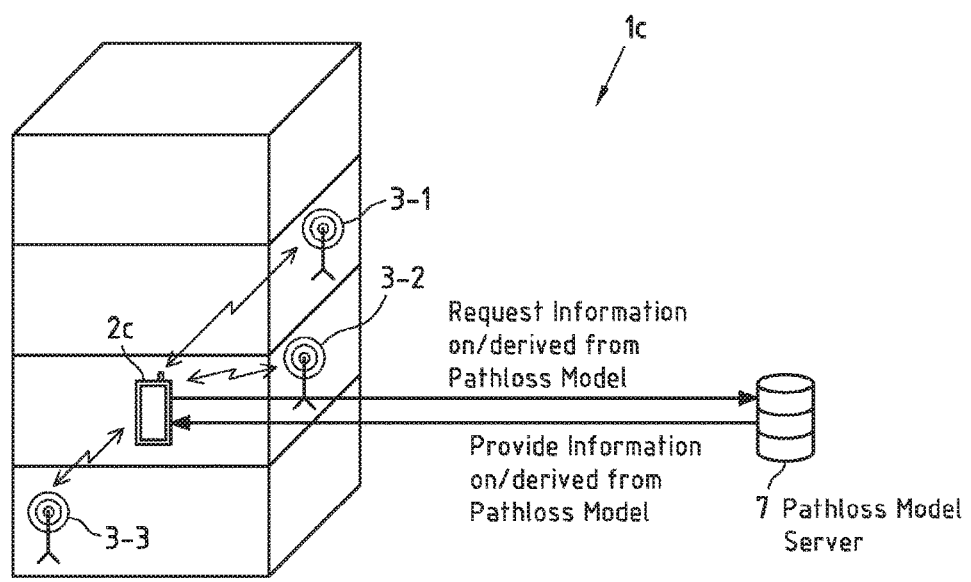

FIG. 1a shows a positioning system 1a, in which example embodiments of apparatuses according to the present invention can be deployed. In FIG. 1a, mobile terminal 2a is capable of observing one or more communication nodes 3-1, 3-2 and 3-3 of one or more communication networks, as will be further described below. Communication nodes 3-1, 3-2 and 3-3 are exemplarily deployed in different floors of a building with four floors. Although advantageous in indoor environments, the present invention is not limited to positioning in indoor scenarios and could equally well also be used for outdoor positioning. It should also be understood that the number and distribution of communication nodes 3-1, 3-2 and 3-3 in FIGS. 1a-1c is merely exemplary.

Each of communication nodes 3-1, 3-2 and 3-3 provides radio coverage in a respective 3D coverage space. Thus an information that a mobile terminal is within respective 3D coverage spaces of one or more communication nodes may be exploited for determining an estimate for the position of the mobile terminal. In addition or alternatively, also information on the respective strength of respective signals received from one or more communication nodes at a mobile terminal may be used for determining a position estimate for the mobile terminal, since the Received Signal Strength (RSS) is physically related to the distance towards the communication node that sent the signal. Embodiments of the present invention thus exploit information on the RSS for determining an estimate for the position of a mobile terminal.

In the positioning system 1a of FIG. 1a, mobile terminal 2a is a collector terminal that is capable of determining or obtaining its current position. To this end, mobile terminal 2a may for example be equipped with a receiver of a Global Navigation Satellite System (GNSS) or may obtain its current position via a user interface by interaction of a user of mobile terminal 2a. Information on this position, together with identification information on one or more communication nodes that can be observed at this position, is provided as a so-called "fingerprint" to path-loss model generation and/or updating server 4. This may happen in regular intervals, or upon request, to name but a few examples. Each fingerprint may pertain to a single position only, or may pertain to several positions, i.e. may comprise position information for several positions and respective identification information on one or more communication nodes that can be observed at these positions.

Server 4, based on fingerprints received from a plurality of collector terminals like mobile terminal 2a, generates and/or updates path-loss models for the one or more communication nodes. This generation and/or updating may possibly be based on other information sources as well, such as for in stance plans (e.g. floor maps) or information on the radio-propagation-related characteristics of the propagation environment, such as for instance characteristics of construction materials used (e.g. characteristics of walls and/or floors).

In the positioning system 1b of FIG. 1b, information on or derived from such path-loss models is stored in path-loss model database 6 and is used by positioning server 5, which has access to path-loss model database 6 or incorporates path-loss model database 6, to determine a position estimate for mobile terminal 2b. To obtain a position estimate from positioning server 5, mobile terminal 2b provides identification information on one or more communication nodes that are observable at the position of mobile terminal 2b, and respective RSS information with respect to these communication nodes, to positioning server 5. Positioning server 5, in response to the received information, retrieves according information on or derived from the path-loss models for these communication nodes and uses this information and the RSS information to determine a position estimate for mobile terminal 2*b*, which position estimate is then provided to mobile terminal 2*a*.

FIG. 1*c* is shows a further positioning system 1*c*, where position estimates for mobile terminal 2*c* are determined by mobile terminal 2*c* itself. To this end, mobile terminal 2*c* has either pre-stored information on or derived from path-loss models or—as shown in FIG. 1*c*—obtains such information from path-loss model server 7. Path-loss model server 7 may for instance incorporate an according path-loss model database (similar to path-loss model 6 of FIG. 1*b*). Mobile terminal 2*c* may for instance specify for which area/space information on or derived from respective path-loss models for communication nodes is required, for instance for a specific building or all buildings of a specific town. The requested information may also depend on the technical capabilities of mobile terminal 2*c*. For instance, if the mobile terminal 2*c* is only capable of observing communication nodes of one or more communication networks, only information pertaining to these communication networks, but no information pertaining to further communication networks is provided, even if the path-loss model database should comprise such information pertaining to further communication networks.

The process of actually determining a position estimate then takes place as described for positioning server 5 in the context of FIG. 1*b* before, only that now the determining is performed locally on mobile terminal 2*c* based on identification information and RSS information created by mobile terminal 2*c* itself.

In the above systems 1*a*-1*c*, non-limiting examples of nodes of communication networks (also denoted as communication network nodes herein) are access points or beacons of communication networks, such as for instance of a WLAN network, a Bluetooth system, a radio-frequency identification (RFID) system or a Near Field Communication (NEC) system, a broadcasting system such as for instance Digital Video Broadcasting (DVB), Digital Audio Broadcasting (DAB) or Frequency-Modulated (FM)/Amplitude-Modulated (AM) radio, a Near Field Communication (NFC) system, etc.). Further examples of communication network nodes are base stations or base transceiver stations (or sectors thereof) of one or more cellular communication networks, such as for instance second generation (2G, for instance the Global System for Mobile Communication (GSM) and its derivatives, such as the General Packet Radio System (GPRS), the Enhanced Data Rates for GSM Evolution (EDGE) or the High Speed Circuit-Switched Data (HSCSD)), third generation (3G, for instance the Universal Mobile Telecommunication System, UMTS, or CDMA-2000) or fourth generation (4G, for instance the Long Term Evolution, LTE, system, the LTE Advanced (LTE-A) system or the IEEE 802.16m WiMAX system) communication networks. A cellular communication network may for instance be characterized by a basically seamless pavement of a geographical area (usually in the order of at least hundreds or thousands of square kilometers) with cells in which coverage is provided by communication network nodes that are operated by the same operator, which network may for instance support communication handover between cells.

Non-limiting examples of a mobile terminal are a cellular phone (e.g. a smartphone), a personal digital assistant, a laptop computer, a tablet computer, a navigation device (which may be portable by a human user or be installed in a vehicle, for example) or a multimedia player. Each of these devices is capable of wirelessly communicating at least in one communication network.

A path-loss model (or radio channel model) may for instance describe how the power of a signal emitted by a communication network node associated with a cell decays with increasing distance from the communication network, for instance under consideration of further parameters as for instance the radio transmission frequency. To this end, the path-loss model may for instance take into account effects of free space propagation, slow fading and fast fading, to name but a few examples. The path-loss channel model may for instance be parameterized by and/or characterized by one or more parameters, such as for instance a path loss exponent, as it is known to a person skilled in the art.

Receiving signals or information from a communication node may for instance require that the mobile terminal is technically capable to receive such signals or information. Thus a mobile terminal may have to support the transmission technology (e.g. the communication standard) used by the communication node. Receiving signals or information from the communication node may also require that the mobile terminal is entitled to communicate with or at least receive signals or information from the node.

Observing a communication node by a mobile terminal may for instance require that the mobile terminal is able to receive one or more signals (e.g. a broadcast channel), which are sent by the communication node with a pre-defined minimum duality (for instance defined in terms of a signal-to-noise ratio or a signal-to-noise and interference ratio), and/or is able to at least partially receive and correctly decode one or more signals sent by the node associated with the cell, and/or is able to receive and correctly decode an identifier of the cell (e.g. a BSSID). Some or all of these conditions for observing a communication node may for instance be met when the mobile terminal is within the coverage space of the communication node associated with the cell.

A communication node may for instance only be identifiable by a mobile terminal if it is observable by the mobile terminal. Therein, a communication node may for instance have an identifier that is unique (e.g. globally unique) at least in the communication network (and for instance also in all other communication networks). Equally well, a communication node may for instance have an identifier that is not globally unique (e.g. only locally unique) in the communication network, but that is at least unique in a sub-region/sub-space of the region/space covered by the communication network. In a WLAN network, an example of a globally unique identifier is a BSSID. In a 3GPP network, an example of a globally unique identifier is the Global Cell Identity (GCI), which is based on the Country Code-Network Code-Cell ID hierarchy in 3GPP networks. An example of an only locally unique identifier in a cellular communication network is the Local Cell Identity (LCI), which is related to the physical resources allocated for the cell. For example, in the case of GSM and its derivatives the physical resources are associated with the cell tower (BISC) and the frequency (ARFCN). The physical resources are re-used in the network, i.e. the same BSIC/ARFCN combination repeats in the network. Thus the LCI can be identified with the corresponding GCI only, when there is additional information on the location, i.e. the mapping LCI→GCI is only locally infective whereas GCI→LCI mapping is globally injective.

Example embodiments of the present invention use a 3D sectorized path-loss model to describe the RSS produced by a communication node. This 3D sectorized path-loss model may for instance be generated as follows:

Having a database of communication nodes, where for each communication node, 3D RSS information obtained from terminal-based measurements in fingerprints as described with respect to FIG. 1a above is stored, for instance in a form of a spatial 3D grid. The third dimension may for instance be expressed in terms of absolute altitude or in terms of floors (height difference). If the third dimension is expressed in floors, in the modelling phase the floor height can be obtained from a map or set to a configured value.

Dividing the measurements pertaining to a communication node for which a 3D sectorized path-loss model is to be generated into 3D sectors. The number of sectors is generally variable and may for instance encompass at least the values: 1 (omnidirectional), 4, 6, 8 and 14.

Using the 3D RSS information to estimate the path loss parameters associated with the communication node in a sectorized way, with a pair of two values ($P_0^{(i)}{}_{(cn)}$, $n^{(i)}{}_{(cn)}$) per sector (i) and per communication node (cn):

$P_0^{(i)}{}_{(cn)}$: the value corresponding to the apparent transmit power from communication node cn in the i-th sector and $n^{(i)}{}_{(cn)}$: the value corresponding to the path-loss coefficient from communication node cn in the i-th sector.

The sectors are defined as sphere sectors as will be explained below. The omnidirectional case is a special case of the 3D model, when there is only one sector in the whole sphere.

Figure 2:
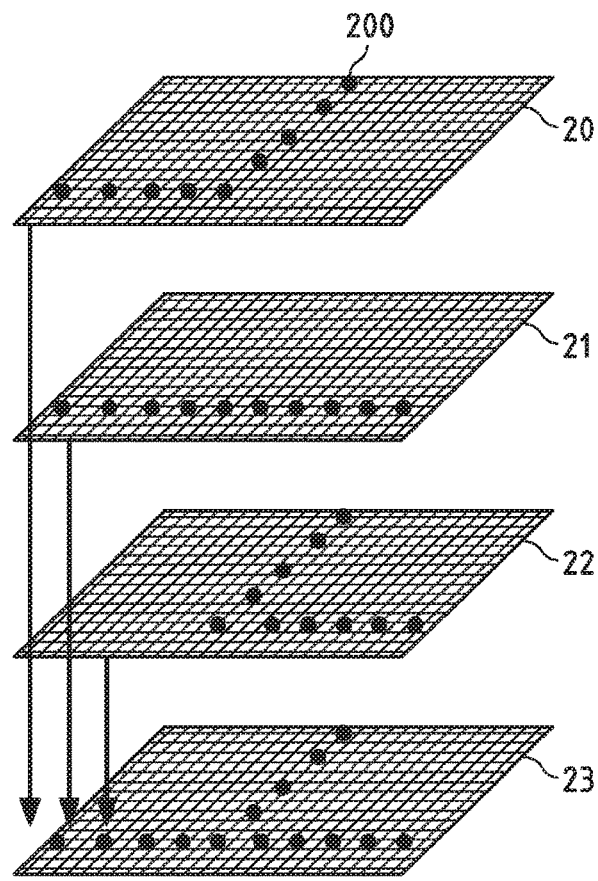
FIG. 2 is an illustration of positions on four different floors where measurements related to communication nodes were taken according to an example embodiment of the present invention.

FIG. 2 shows an example of measurement data that has been gathered on four floors 20, 21, 22, 23 of a building (e.g. the building of FIG. 1a). The positions for which measurements (position information, identification information pertaining to the observed communication nodes and respective RSS information for the signals from the observed communication nodes) are indicated by solid dots, of which one has been exemplarily labeled with reference numeral 200. The measurement data is at least temporarily stored in a server, such as path-loss model generation/updating server 4 of FIG. 1a. As described with respect to FIG. 1a above, this data may come from the users of the positioning technology (crowd-sourcing), or can be a result of dedicated data collection. The data is stored, e.g. per floor, and it contains the 3D (x, y, z) coordinates of the measurement positions as well as the associated RSS information from each observed communication node. Alternatively, equivalent data could be stored, from which the x, y, z could be inferred. For example, data could be stored as a table where x, y coordinates are not given explicitly, but can be deduced (e.g. from indices given in the table).

When the floor height is not known, it is for instance possible to make the convention that a fixed and constant floor height is assigned to each floor, such that the first floor has the height 0, the second floor has a height h (e.g. 4 m), the third floor has a height 2*h, etc. If the value of h is not known a-priori (i.e. from a map etc.), the value in the model may for instance be transferred to the mobile terminal for the positioning stage in which the pathloss parameters are used for 3D positioning of the mobile terminal. The mobile terminal may need to know the height used in the model generation. The height may for instance be indicated to the mobile terminal explicitly. Alternatively, the model may indicate that the height from the indoor map was used. Therein, it is assumed that the device has access to the indoor map information.

Figure 3:
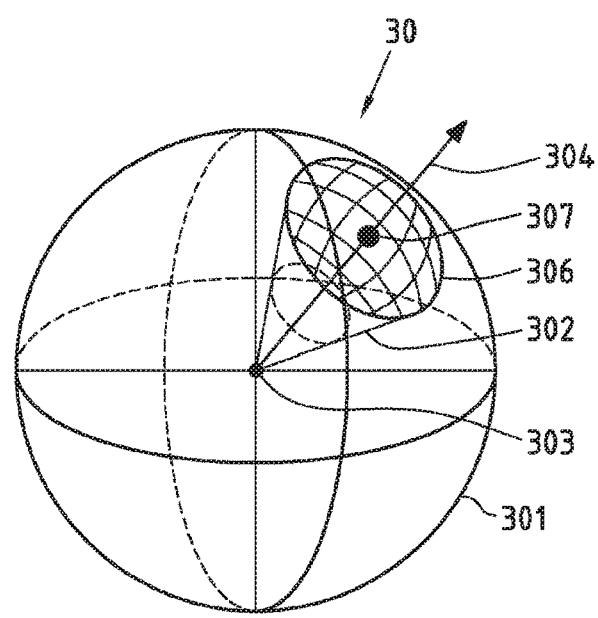
FIG. 3 is an illustration of a 3D sector according to an example embodiment of the present invention.
Figure 4A:
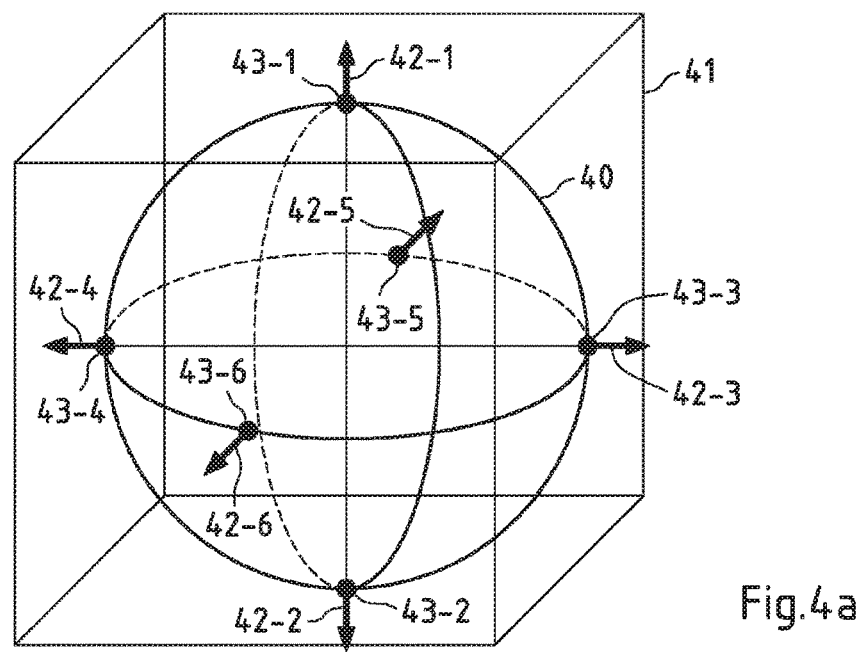
FIGS. 4a-4b are illustrations of six (FIG. 4a) and eight (FIG. 4b) direction angles defining respective 3D sectors.
Figure 4B:
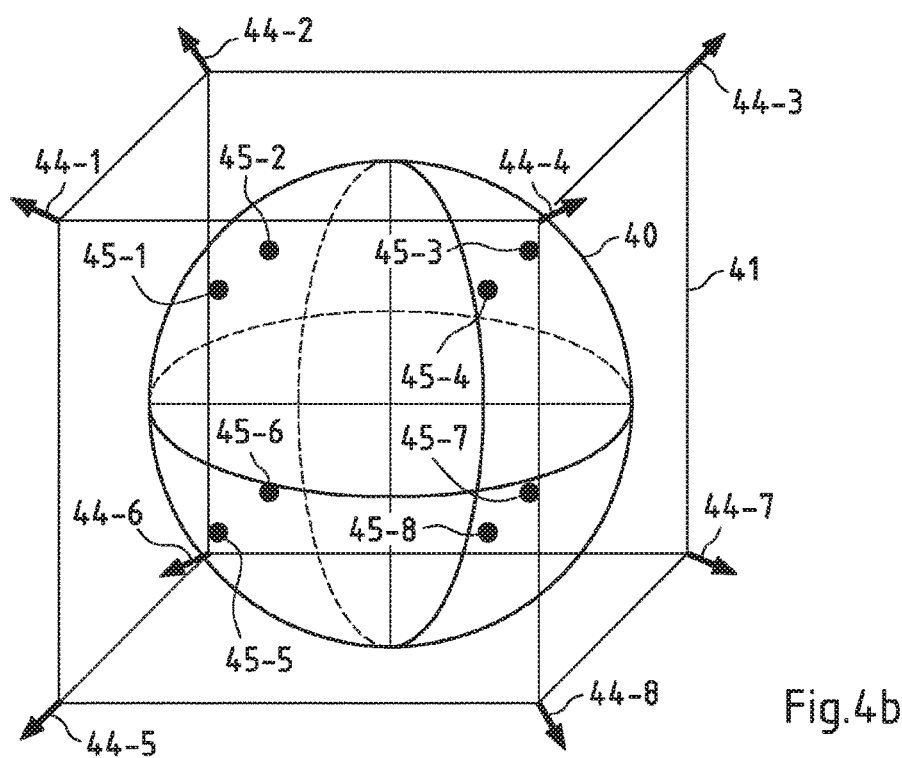

FIG. 3 shows the definition 30 of the 3D sector 302 as part of the unit sphere 301 with sphere center 303. The whole space is divided into several directions 304 (examples are shown in FIGS. 4a and 4b as explained below) which can be arbitrarily chosen using any desired azimuth and elevation angles. Directions 304 may for instance be appointed symmetrically around the sphere 301 to achieve coverage over all possible azimuth and elevation angles. After defining the direction angles 304, a cone 302 with a spherical convex base 306 lying on the surface of the sphere 301 is built around each direction 304. The cone opening is defined by an opening angle (or a sector width). The sector width is defined as the ratio between the area 306 (i.e. the convex-formed base of the conical 3D sector entirely lying on the unit sphere and illustrated in hashed form in FIG. 3) that a sector 302 takes on a sphere surface compared to the total area of the sphere surface (i.e. $A_{sector}/A_{sphere}$), and it can vary between 0 and 1. For example, a sector width=0.5 means that each cone 302 is in fact a semi-sphere. If the sector width is too small, the sectors 302 do not fill the whole surface of the sphere 301 and may leave empty spots in the space. The choice of the sector width parameter is a design choice. In embodiments of the invention, the sectors 302 somewhat overlap to handle large variations of parameters between adjacent sectors 302.

FIGS. 4a and 4b show two examples of setting the sector direction angles, respectively. The plot in FIG. 4a has six sectors (up, down, left, right, front and backwards) and the plot in FIG. 4b has eight sectors. Sector directions are illustrated via an arrow (42-1 . . . 42-6 in FIG. 4a, and 44-1 . . . 44-8 in FIG. 4b), and the black dots define the point where each direction angle hits the unit sphere surface (43-1 . . . 43-6 in FIG. 4a corresponding to the direction 42-1 . . . 42-6, and 45-1 . . . 45-8, corresponding to the directions 44-1 . . . 44-8). A sector direction is understood here as the perpendicular uniting, the sphere center with the center of the base of the cone that defines that sector (see the direction angle 304 shown in FIG. 3 to illustrate this idea). The direction angles are set manually, and at least the values 1 (omni-directional case) 2, 4, 6, 8 and 14 are for instance practical, since they can all be easily derived and understood by exploiting the faces and corner points of a cube.

When dividing the measurements into sectors, the measurement coordinates ($x_i$, $y_i$, $z_i$) are considered as vectors and their norms are normalized to one. Thus all the measurements will be on a unit sphere surface after the normalization.

The division into 3D sectors is then done in two steps:
1. For each sector k, calculate the Euclidian distances $d_{i,k}$= $\sqrt{(x_i-x_k)^2+(y_i-y_k)^2+(z_i-z_k)^2}$ between measurement points ($x_i$, $y_i$, $z_i$) and the sector-specific direction angle point ($x_k$, $y_k$, $z_k$). The direction angle point is the black dot (on the unit sphere surface, see FIGS. 4a (dots 43-1 . . . 43-6) and 4b (dots 45-1 . . . 45-8)) found at the intersection of the direction angle 304 and the unit sphere 301 in FIG. 2.
2. For each sector k, if $d_{i,k}<2\sqrt{SectorWidth_k}$ then the measurement ($x_i$, $y_i$, $z_i$) is decided to belong to that specific sector k. Notice that if sector width is large enough, one measurement point can belong into two or more sectors at the same time.

Therein, the equation in item 2 above is derived as follows:

The area of a spherical cap of a sector k on the unit sphere 301 (see FIG. 3) is equal to the chord length $x_k$ squared times $\pi$, and also equal to the $SectorWidth_k$ times the total area of the unit sphere 301 with radius R=1. The "chord" here is a straight line extending from the pierce point 307 on the sphere 301 to a point on the edge of the spherical cap 306. The chord length $x_k$ as a function of the SectorWidth$_k$ can thus be calculated as follows:

$$\text{Area}_k = \text{SectorWidth}_k \cdot 4 \cdot \pi \cdot R^2 = \pi \cdot x_k^2$$

With R=1 (unit sphere), we have $x_k = 2 \cdot \sqrt{\text{SectorWidth}_k}$. In order for a point $(x_i, y_i, z_i)$ (which has a norm normalized to 1 as stated above) to be on the spherical cap of sector k and thus within sector k, we must have $x_k > d_{i,k}$, yielding the equation of item 2 above.

The above method allows a clear code implementation and clear definition for 3D-sectors by using only two parameters: the direction angle point (defined either with $(x_k, y_k, z_k)$ coordinate or with a corresponding azimuth and elevation angle) and the sector width.

Figure 5A:
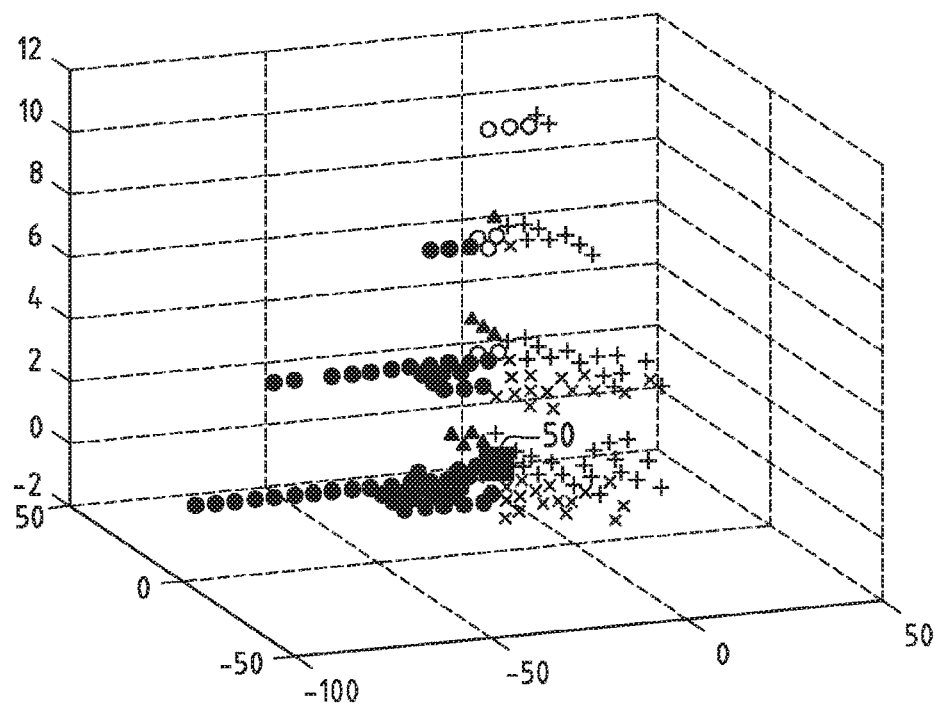
FIG. 5a-5b are illustrations of measurements taken with respect to a communication node on four different floors of a building according to an example embodiment of the present invention, non-normalized (FIG. 5a) and normalized to the unit sphere (FIG. 5b)
Figure 5B:
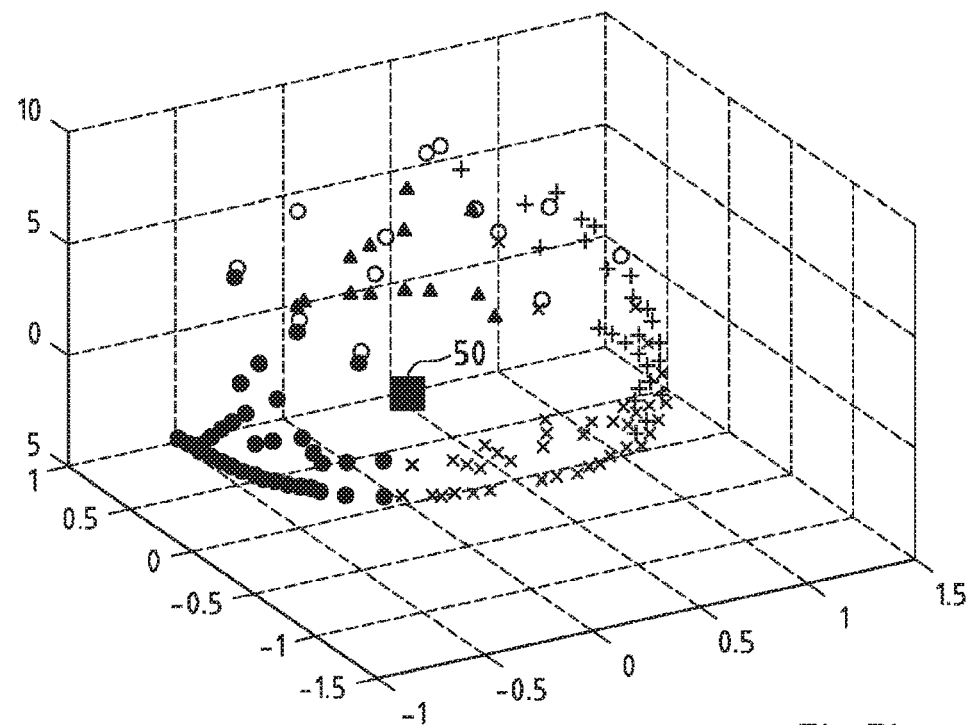

FIGS. 5a and 5b show exemplary representations of measurement data with respect to a communication node 50 from four floors of a building without normalization (FIG. 5a) and with normalization to the unit sphere (FIG. 5b). Each measurement has position information determining its location in the coordinate systems of FIGS. 5a and 5b. Furthermore, the RSS information with respect to communication node 50 is indicated by the sign (dot sign, circle sign, plus sign, x sign triangle sign) and assigned to the respective measurement datum.

Figure 6:
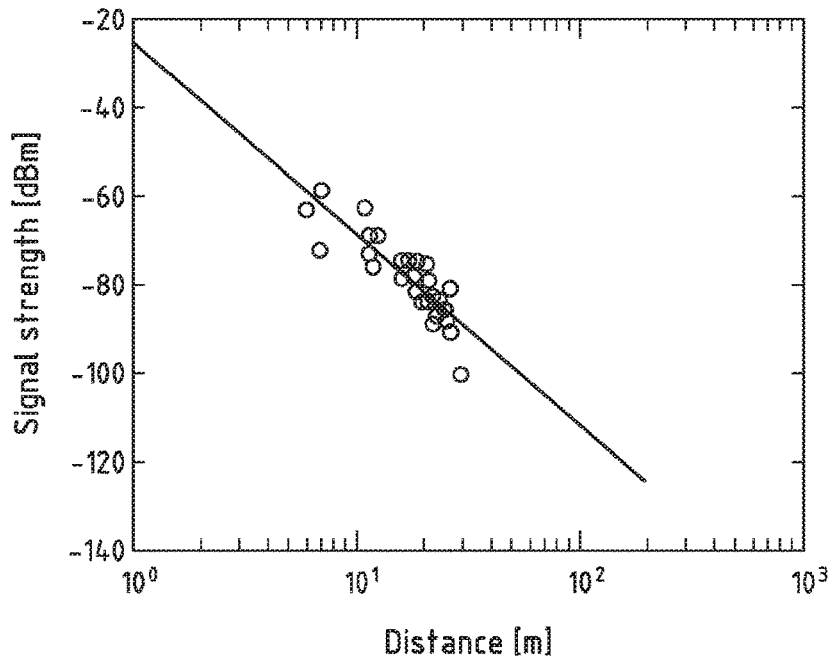
FIG. 6 is an illustration of a fitting of a path-loss function to a plurality of measurements within one sector of a 3D sectorized path-loss model according to an example embodiment of the present invention.

FIG. 6 shows an example of how the path-loss parameters P and n of a single sector of a 3D sectorized path-loss model for a communication node are determined. To this end, for all measurements that have been divided into this sector as described above, from their respective coordinates $(x_i, y_i, z_i)$, the respective distance $d_i$ with respect to the assumed position of the communication node is determined, and the respective logarithm $\log(d_i)$ of this distance is plotted together with the respective RSS$_i$ information (e.g. the RSS in dBm) in a two-dimensional coordinate system as shown in FIG. 6. Therein, such a log $(d_i)$ RSS$_i$ data pair is exemplarily labeled 60. If plural of such data pairs are available for the same sector (and the same communication node), a curve 61 can be fitted to these data pairs as shown in FIG. 6, for instance by using known curve fitting techniques.

In FIG. 6, a fitting of the data pairs to a path-loss function $P = P_0 - 10 \, n \log(d)$ is desired, and the fining returns the parameters $P_0$ and n as $P_0 \approx -24$ dBm and n$\approx$4.3 dBm/m.

The curve fitting can be linear fit, polynomial fit or Bayesian fit, to name but a few examples. The path loss curve fitting in one 3D sector relies on the existence of sufficient measurement data within that particular sector. If data is missing or insufficient, interpolation can be used to model the missing data in some sectors.

To be able to determine the distances di of the measurements from the communication node, the position of the communication node has to be determined. In the 3D sectorized path-loss mode, the sphere "centre" 303 (see FIG. 3) is the apparent location of the communication node. This position can for instance be found by considering all the measurement points for the communication node and calculating the weighted average position using the RSS information as the weight. Alternatively, the communication node position may for instance be set as the location of the measurement point with the highest RSS. Thus among all the measurements pertaining to a communication node, the position information of the measurement with the largest RSS (according to its RSS information) is assumed as the position of the communication node to be used in the 3D sectorized path-loss model (e.g. for all sectors; further alternatively, the position of the measurement with the largest RSS per sector may be used as the position of the communication node for generating the path-loss model for this sector).

It should be noted that the 3D path loss modeling, (generation) stage is independent of the positioning stage. Any path-loss-based localization method (such as Maximum Likelihood, Bayesian, Kalman filtering, etc) can be used in the positioning stage.

In the following, exemplary embodiments of the present invention will be described that exploit the principle of a 3D sectorized path-loss model. Therein, the description presented above shall be understood as exemplary, non-limiting support for the description of these exemplary embodiments, so that features from the above description can provide further optional details, either in isolation or as a combination of several features, for the exemplary embodiments described on a more general level below.

Figure 7:
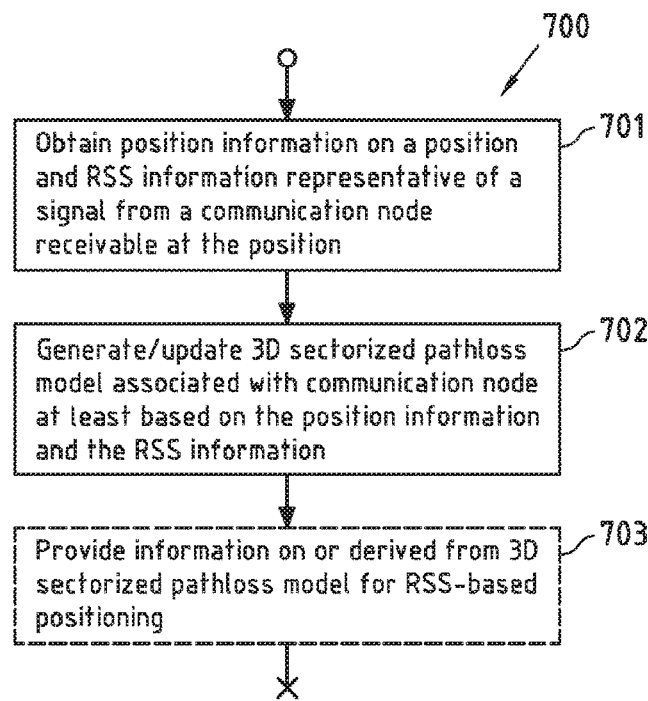
FIGS. 7-10 are flowcharts of example embodiments of methods according to the present invention.

A first example method according to the invention—illustrated by the flowchart 700 of FIG. 7—is performed by an apparatus and comprises obtaining position information on a position and RSS information representative of a strength of a signal from a communication node receivable at the position (step 701); and generating or updating a 3D sectorized path-loss model associated with the communication node at least based on the position information and the received signal strength information (step 702), wherein the position information and the received signal strength information are used to generate or update one or more path-loss parameters for a 3D sector of a set of one or more 3D sectors of the 3D sectorized path-loss model in which 3D sector the position is located.

The position information and the RSS information may for instance stem from a mobile terminal, as explained with reference to FIG. 1a above. It may for instance be obtained by an apparatus that is or forms part of a server, such as for instance path-loss generation/updating server 4 of FIG. 1a. This information may for instance be obtained together with similar information pertaining to further positions, either from the same mobile terminal or from other mobile terminals. At least based on this position information and the RSS information, a 3D sectorized path-loss model for the communication node is generated (e.g. if it did not exist before). If a 3D sectorized path-loss model already exists, it may be updated, e.g. on a regular basis, or if it is detected that the communication node and/or the propagation environment have undergone changes. Examples for generating a 3D sectorized path-loss model have already been described above. Updating may be for instance be performed by computing the path-loss parameters anew for each 3D sector. Alternatively, the previous path-loss parameters may be transitioned into new path-loss parameters by using weighting factors.

The position information may for instance be obtained as 3D coordinates. Equally well, they may be obtained as 2D coordinates, with the coordinate of the third dimension being obtained as further (e.g. non-coordinate) information such as for instance a floor level (e.g. "first floor").

The first example method according to the invention may for instance further comprise obtaining identification information allowing to identify the communication node, wherein a plurality of communication nodes comprising the communication node exist, and wherein at least the position information and the received signal strength information are used for generating or updating only the 3D sectorized path-loss model for the communication node identified by the identification information. The identification information may for instance comprise a BSSID in case of the communication node being a WLAN access point. The identification information may for instance allow to globally identify a communication node (e.g. uniquely in a communication network or even in several communication networks), or may for instance only allow to locally (non-globally) identify a communication node (e.g. by using the physical resources such as frequencies or spreading codes, which may be reused within the communication network). From such a local identification, nevertheless a global identification may be derived based on further information, for instance between an only locally identifiable communication node and a globally identifiable communication node.

Therein, the position information, the received signal strength information and the identification information may for instance be determined by a device and provided in a fingerprint. The fingerprint may for instance also comprise further information.

According to the first example method according to the invention, respective position information and respective received signal strength information pertaining to a plurality of positions located in the 3D sector may be used to generate or update the path-loss parameters for the 3D sector. The respective position information and the respective RSS information pertaining to the plurality of positions may for instance be determined by one device (e.g. a mobile terminal) or by several devices. If provided by one device, this information may be provided in one or more fingerprints.

Therein, respective distances between the positions indicated by the respective position information and a position of the communication node are determined at least based on the respective position information pertaining to the positions and used together with the respective signal strength information of the positions to determine the path-loss parameters.

For instance, the respective distances between the positions indicated by the respective position information and the position of the communication node and the respective signal strength information of the positions are used as respective data pairs in a curve fining process for determining the path-loss parameters. An example of such a curve fitting process has already been presented above with respect to FIG. 6

The position of the communication node may for instance be estimated at least based on the respective position information and the respective received signal strength information pertaining to the plurality of positions located in the 3D sector. For example, the position of the communication node may be estimated based on respective position information pertaining to a position for which respective received signal strength information indicates a largest received signal strength among the plurality of positions. Alternatively, the position of the communication node may be estimated as or based on an average of the positions indicated by the respective position information weighted with the respective received signal strength indicated by the respective signal strength information.

In the first example method according to of the invention, information on or derived from the 3D sectorized path-loss model is useable, together with received signal strength information representative of a strength of a signal received from the communication node by a device, in a process of determining an estimate of a position of the device. To this end, this information may be provided to another device, e.g. to a server (e.g. positioning server 5 of FIG. 1*b*) or a mobile terminal (e.g. mobile terminal 2*c* of FIG. 1*c*).

Figure 8:
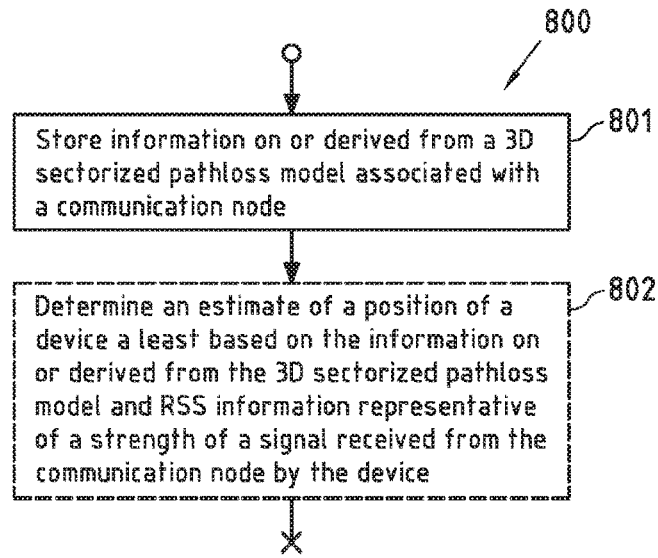

A second example method according to the invention—illustrated by the flowchart 800 of FIG. 8—is performed by an apparatus, and comprises storing information on or derived from a 3D sectorized path-loss model associated with a communication node (step 801), the 3D sectorized path-loss model comprising one or more 3D sectors with one or more respective path-loss parameters, the information on or derived from the 3D sectorized path-loss model useable, together with received signal strength information representative of a strength of a signal received from the communication node by a device, in a process of determining an estimate of a position of the device.

The second example method according to the invention may for instance be performed by a server (e.g. path-loss model generation/updating server 4 of FIG. 1*a* or positioning server 5 of FIG. 1*b* or path-loss model server 7 of FIG. 1*e*) or a mobile terminal (e.g. mobile terminal 2*c* of FIG. 1*c*).

Figure 9:
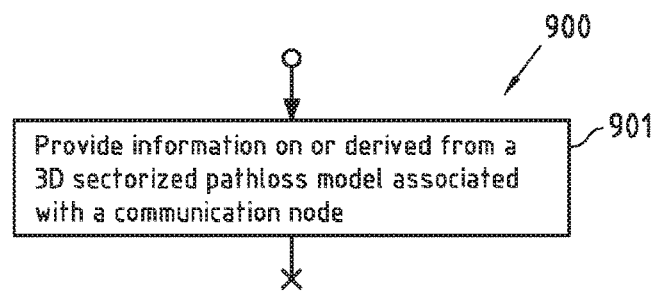

A third example method according to the invention—illustrated by the flowchart 900 of FIG. 9—is performed by an apparatus, and comprises providing information on or derived from a 3D sectorized path-loss model associated with a communication node (step 901), the 3D sectorized path-loss model comprising one or more 3D sectors with one or more respective path-loss parameters, the information on or derived from the 3D sectorized path-loss model useable, together with received signal strength information representative of a strength of a signal received from the communication node by a device, in a process of determining an estimate of a position of the device.

The third example method according to the invention may for instance be performed by a server (e.g. path-loss model server 7 of FIG. 1*c*).

Figure 10:
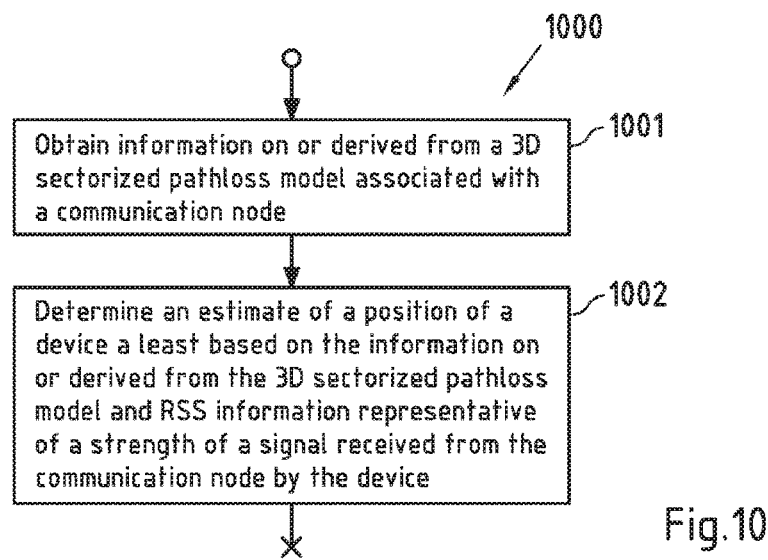

A fourth example method according to the invention—illustrated by the flowchart 1000 of FIG. 10—is performed by an apparatus, and comprises obtaining information on or derived from a 3D sectorized path-loss model associated with a communication node (step 1001), the 3D sectorized path-loss model comprising one or more 3D sectors with one or more respective path-loss parameters, the information on or derived from the 3D sectorized path-loss model useable, together with received signal strength information representative of a strength of a signal received from the communication node by a device, in a process of determining an estimate of a position of the device.

The fourth example embodiment according to the invention may for instance be performed by a server (e.g. positioning server 5 of FIG. 1*b*) or a mobile terminal (e.g. mobile terminal 1*c* of FIG. 1*c*).

The second and fourth example methods according to the invention may for instance comprise performing the process of determining the estimate of the position of the device, as illustrated by steps 802 of FIG. 8 and 1002 of FIG. 10.

In the process of determining an estimate of the position of the device, information on or derived from a 3D sectorized path-loss model associated with a further communication node may for instance be used together with received signal strength information representative of a strength of a signal received from the further communication node by the device.

The respective 3D sectorized path-loss models and/or the respective information on or derived from these 3D sectorized path-loss models for the different communication nodes may for instance be selected based on respective identification information allowing to respectively identify the different communication nodes, the respective identification information determined by the device.

In the process of determining an estimate of the position of the device, the received signal strength information and the information on or derived from the 3D sectorized path-loss model associated with the communication node may for instance be used to determine likelihood information expressing a likelihood that a position is the position of the device, wherein the received signal strength information representative of the strength of the signal received from the further communication node by the device and the information on or derived from the 3D sectorized path-loss model associated with the further communication node is used to determine further likelihood information expressing a likelihood that a position is the position of the device, and wherein both the likelihood information and the further likelihood information are jointly considered to obtain the estimate of the position of the device.

Therein, the likelihood information may for instance be determined for a plurality of predefined positions. The further likelihood information may for instance also be determined for the plurality of predefined positions, or for a deviating plurality of positions.

The plurality of predefined positions may for instance form a 3D grid.

The 3D grid may for instance be a grid with equidistant positions in at least one dimension. It may for instance have respectively equidistant positions in two or three dimensions.

According to the fourth example method according to the invention, there may for instance be, for a 3D sectorized path-loss model, N 3D sectors with respective path-loss parameters (e.g. an assumed transmission power and a path-loss coefficient of a logarithmic path-loss model), where N is an integer number. This may be an example of information on the 3D sectorized path-loss model. Furthermore, the position of the communication node for which the 3D sectorized path-loss model holds may be known. For instance to simplify the processing involved in positioning, a symmetric cubic grid may for instance be set around the position of the communication node. For each grid point, it may then first be evaluated into which 3D sector it belongs. Furthermore, the distance towards the communication node is determined. At least the distance and the path-loss parameters of this 3D sector are then used to determine an expected RSS for this grid point. If a grid point belongs to two sectors, for instance the larger RSS may be used. Alternatively, for instance an average value of both RSS values may be used, e.g. a linear or geometric average, to name but a few examples. In this way, RSS levels associated with grid points of the 3D grid are obtained. These RSS levels can be compared to a RSS measured by a mobile terminal to be positioned, in order to get the likelihood that the mobile terminal is positioned at the respective position associated with the respective RSS level. Such RSS levels associated with 3D grid points, which may be considered as an example for information derived from the 3D sectorized path-loss model, may for instance have been determined for a plurality of communication nodes, e.g. for all communication nodes of one or more networks in a building. Therein, the grid points may for instance be the same for all or at least a subgroup of the communication nodes. In positioning then, based on identification information (identifying the observed communication nodes) and respective RSS information (representative of the RSS with respect to the respective observed communication node), Which may for instance be determined by a mobile terminal to be positioned, for instance the RSS levels are retrieved for the observed communication nodes and used to determine, for each grid point and communication node, a likelihood that the mobile terminal is positioned at this grid position. For each grid point, then the respective likelihoods for each observed communication node may then for instance be multiplied to obtain an overall likelihood that the mobile terminal is located at this grid point. The grid point with the largest overall likelihood (normalized over all grid points) then may be considered the estimate of the position of the mobile terminal.

As an alternative to this grid-based (i.e. discretized) approach, where the likelihood per-grid-point is determined and which allows modeling of arbitrary probability distributions, the likelihood information could also be presented as a sum of Gaussian distributions (in contrast to having it as discrete values only). In the limit of an infinite number of Gaussian distributions, any arbitrary distribution can be expressed by Gaussian distributions.

According to the first, second, third and fourth example methods according to the invention, the path-loss parameters are an assumed transmit power of the communication node and a path-loss coefficient that characterizes a steepness of a decay of the assumed transmit power with a logarithm of a distance towards the communication node. The path-loss parameters may for instance be an assumed transmit power $P0$ of the communication node and a path-loss coefficient $n$ of a path-loss model describing a received signal strength $P$ in a distance $d$ towards the communication node as $P=P0-10*n*\log(d)$. Such a model has already been discussed with respect to FIG. 6 above.

According to the first, second, third and fourth example methods according to the invention, the 3D sectors are 3D sphere sectors of a sphere having a position of the communication node at its center. The 3D sectors may for instance be of conical form, wherein respective tops of the 3D sectors lye on the center of the sphere and wherein respective convex bases of the 3D sectors lye on a surface of the sphere.

Therein, respective ratios of an area of the respective convex bases and a total area of the surface of the sphere may for instance define respective sector widths of the 3D sectors.

A position may then for instance be considered to be located in a 3D sector of the 3D sectors if an Euclidean distance between the position and a center of the convex base of the 3D sector are smaller than or equal to 2 times a square root of the sector width.

According to the first, second, third and fourth example methods according to the invention, the 3D sectors are symmetrically arranged in a sphere. The 3D sectors may for instance at least partially overlap, so that a position may be located in one or more 3D sectors (and may for instance be considered in the generation/updating of path-loss models for these one or more 3D sectors).

According to the first, second, third and fourth example methods according to the invention, each of the 3D sectors may for instance have its own set of path-loss parameters.

According to the first, second, third and fourth example methods according to the invention, at least one path-loss parameter for at least two different 3D sectors has respectively different values. For instance all path-loss parameters for at least two (or for instance even all) 3D sectors have respectively different values. A first 3D sector thus may have a different assumed transmission power and a different path-loss coefficient as a second 3D sector.

According to the first, second, third and fourth example methods according to the invention, the 3D sectorized path-loss model has at least two 3D sectors.

Furthermore, with respect to the first, second, third and fourth example methods according to the invention and their further optional features described above, the following is disclosed:

A computer program code, the computer program code when executed by a processor causing an apparatus to perform any of the first, second, third and fourth example methods according to the invention and optionally one or more of their further features described above. The computer program code may for instance be stored in a computer readable storage medium. Therein, if a method comprises several methods steps, the computer program code may for instance comprise respective instructions for each of these steps.

An apparatus configured to realize or comprising respective means for realizing any of the first, second, third and fourth example methods according to the invention and optionally one or more of their further features described above. Therein, if a method comprises several methods steps; there shall be respective means for each of these steps.

An apparatus comprising at least one processor and at least one memory including computer program code, the at least one memory and the computer program code configured to, with the at least one processor, cause an apparatus at least to perform any of the first, second, third and fourth example methods according to the invention and optionally one or more of their further features described above.

Figure 11:
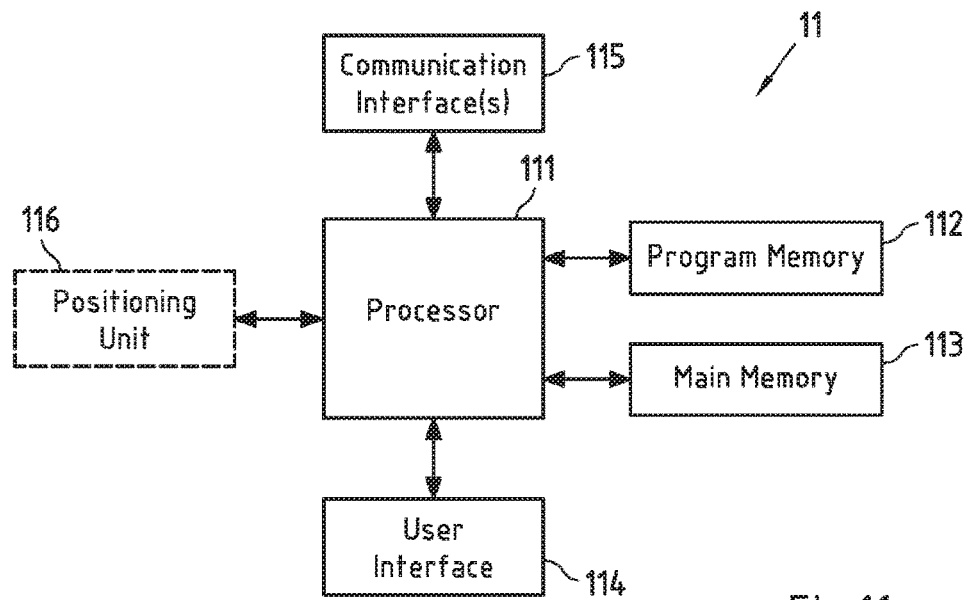
FIGS. 11-12 are block diagrams of example embodiments of apparatuses according to the present invention.

FIG. 11 is a schematic block diagram of an example embodiment of an apparatus 11 according to the invention. This apparatus may represent or at least form a part (e.g. as a module) of a mobile terminal, e.g. the mobile terminal 1*a* of FIG. 1*a*, the mobile terminal 1*b* of FIG. 1*b* or the mobile terminal 1*c* of FIG. 1*c*.

Apparatus 11 comprises a processor 111. Processor 111 may represent a single processor or two or more processors, which are for instance at least partially coupled, for instance via a bus. Processor 111 executes a program code stored in program memory 112. This program code may for instance cause apparatus 11 to perform any one of the second and fourth example methods according to the invention (see the flowcharts of FIGS. 8 and 10), when executed on processor 111. Processor 111 further interfaces with a main memory 113.

Some or all of memories 112 and 113 may also be included into processor 20. One of or both of memories 112 and 113 may be fixedly connected to processor 111 or at least partially removable from processor 111, for instance in the form of a memory card or stick. Program memory 112 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Program memory 112 may also comprise an operating system for processor 111. Program memory 112 may for instance comprise a first memory portion that is fixedly installed in apparatus 11, and a second memory portion that is removable from apparatus 11, for instance in the form of a removable SD memory card. One or more sets of PRI that are useable by apparatus 11 to determine positions may for instance be stored in program memory 112. Main memory 113 may for instance be a volatile memory. It may for instance be a RAM or DRAM memory, to give but a few non-limiting examples. It may for instance be used as a working memory for processor 111 when executing an operating system and/or programs.

Processor 111 further controls a communication interface 115 configured to receive and/or output information. For instance, communication interface 115 may be configured to receive signals from nodes 3-1, 3-2 and 3-3 of system 1*a*, 1*b* or 1*c* of FIGS. 1*a*, 1*b* and 1*c*, respectively. Communication interface 115 may further be configured to transmit information to path-loss model generation/updating server 4 of system 1*a* (see FIG. 1*a*), to exchange information with positioning server 5 of system 1*b* (see FIG. 1*b*) or to exchange information with path-loss model server 7 of system 1*c* (see FIG. 1*c*), e.g. depending on whether apparatus 11 represents or forms part of mobile terminal 2*a*, 2*b* or 2*c*, respectively. This communication may for instance be based on a wireless connection. Communication interface 115 may thus for instance comprise circuitry such as modulators, filters, mixers, switches and/or one or more antennas to allow transmission and/or reception of signals. In embodiments of the invention, communication interface 115 is configured to allow communication according to a 2G/3G/4G cellular communication network and for instance also a non-cellular communication network, such as for instance a WLAN network. Nevertheless, the communication route between mobile terminal 2*a*/2*b*/2*c* and servers 4/5/7 may equally well at least partially comprise wire-bound portions. For instance, servers 4/5/7 may be connected to a back-bone of a wireless communication network (associated with mobile terminal 2*a*/2*b*/2*c*) via a wire-bound network such as for instance the Internet. Communication interface 115 may for instance include a modem that is capable of receiving signals from communication nodes 3-1, 3-2 and 3-3 and to identify these communication nodes, e.g. based on their BSSID. This modem may also be capable of determining the RSS of signals received from communication nodes. Furthermore, communication interface 115 may be configured to provide this identification/RSS information to processor 111 to enable processor 111 to use this information for positioning purposes (e.g. to enable processor 111 to provide this information in a fingerprint to another entity or to provide this information to a positioning server, or to use this information for terminal-based positioning).

Processor 111 further controls a user interface 114 configured to present information to a user of apparatus 11 and/or to receive information from such a user. Such information may for instance comprise information on a position estimate determined by RSS-based positioning. User interface 114 may for instance be the standard user interface via which a user of apparatus 11 interacts with apparatus 11 to control other functionality thereof, such as making phone calls, browsing the Internet, etc.

Processor 111 may further control an optional positioning unit 116 (given in dashed lines in FIG. 11) configured to receive positioning information of a GNSS such as Global Positioning System (GPS), Galileo, Global Navigation Satellite System (i.e. "Globalnaja Nawigazionnaja Sputnikowaja Sistema", GLONASS) and Quasi-Zenith Satellite System (QZSS). It should be noted that, even in case apparatus 11 has a GNSS interface 116, the user of apparatus 11 or for instance the mobile terminal comprising apparatus 11 can still benefit from using the above-described RSS-based positioning technologies, since these technologies may allow for significantly reduced time-to-first-fix and/or lower power consumption as compared to GNSS-based positioning. Also, not all applications on a mobile terminal may require highly accurate GNSS-based position estimates. For instance, for a local weather application, it may be sufficient to use RSS-based position estimates. Also, and perhaps even more important, RSS-based positioning technologies work indoors, which is generally a challenging environment for GNSS-based technologies. Positioning unit 116 may equally well other or additional positioning techniques, e.g. sensor-based positioning techniques, or RSS-based positioning techniques, or may be configured to allow manual entry of position information (e.g. read from a map) by a user of apparatus 11 via user interface 114.

The components 112-116 of apparatus 11 may for instance be connected with processor 111 by means of one or more serial and/or parallel busses.

Figure 12:
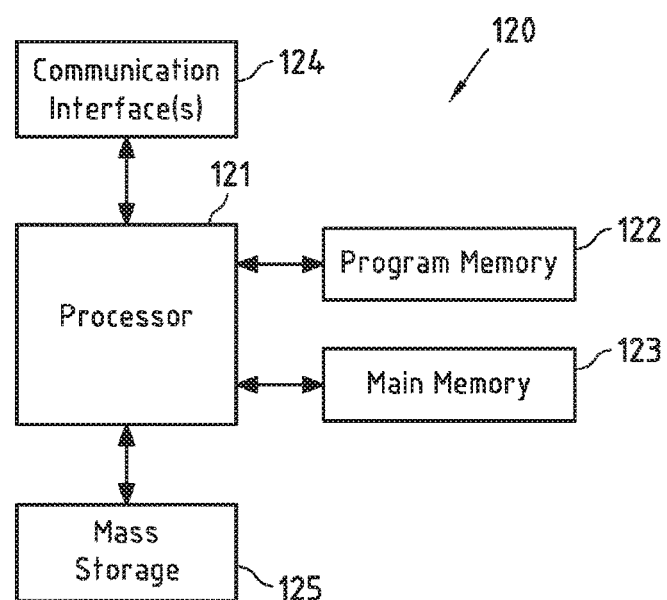

FIG. 12 is a schematic block diagram of an example embodiment of an apparatus 120 according to the invention. This apparatus may represents or at least forms a part (e.g. as a module) of a server, e.g. the path-loss model generation/updating server 4 of FIG. 1a, the positioning server 5 of FIG. 1b or the path-loss model server 7 of FIG. 1c.

Apparatus 120 comprises a processor 121. Processor 121 may represent a single processor or two or more processors, which are for instance at least partially coupled, for instance via a bus. Processor 121 executes a program code stored in program memory 122. This program code may for instance cause apparatus 120 to perform any one of the example embodiments of methods according to the first, second, third and fourth example method according to the invention (see the flowcharts of FIGS. 7-10) or combinations thereof, when executed on processor 121.

Processor 121 further interfaces with a main memory 123 (for instance acting as a working memory) and optionally with a mass storage 125, which may for instance store information on or derived from 3D sectorized path-loss models for one or more communication nodes of one or more communication networks. Such a mass storage may for instance be present if apparatus 120 embodies the path-loss model server 7 of FIG. 1c.

Memories 122 and 123 may have the same or a similar configuration and relationship with processor 121 as already described for memories 112 and 113 of apparatus 11 above. Mass storage 125 may for instance be embodied as mass storage device, for instance with capacities of several Gigabytes or several Terabytes. It may either be fixedly connected to processor 121, or may be releasably connectable thereto. Non-limiting examples of mass storage 125 are a direct-attached storage (DAS), a storage area network (SAN) or a Network-attached storage (NAS).

Processor 121 further controls a communication interface 124 configured to receive and/or output information. For instance, communication interface 124 may be configured to exchange information with mobile terminal 2a/2b/2c of system 1a/1b/1c (see FIGS. 1a/1b/1c). This may for instance comprise receiving fingerprints from mobile terminal 2a or identification information and RSS information from mobile terminal 2b or a request for information on or derived from a 3D sectorized path-loss model from mobile terminal 2c, and providing a position estimate to mobile terminal 2b, or the requested information on or derived from a 3D sectorized path-loss model. This communication may for instance be based on a wireless connection. Communication interface 124 may thus for instance comprise circuitry such as modulators, filters, mixers, switches and/or one or more antennas to allow transmission and/or reception of signals. In embodiments of the invention, communication interface 124 is configured to allow communication according to a 2G/3G/4G cellular communication network and/or a non-cellular communication network, e.g. a WLAN network, Equally well, communication interface 124 may be a wire-bound network interface. It may for instance allow apparatus 120 to communicate with a network such as the internet. The communication channel between apparatus 120 (e.g. server 4/5/7) and mobile terminal 2a/2b/2c may then for instance comprise both wire-bound and wireless portions. The wire-bound portion may for instance connect communication interface 124 with a backbone of a wireless communication network, and the wireless portion may connect the wireless communication network with mobile terminal 2a/2b/2c. Furthermore, communication interface 124 may be configured to exchange information with path-loss model database 6 of FIG. 1b. This exchange may for instance be performed via a wire-bound network such as for instance the internet.

The components 122-125 of apparatus 120 may for instance be connected with processor 121 by means of one or more serial and/or parallel busses.

Program memories 112 of FIG. 11 and 122 of FIG. 12 may be considered as tangible storage media, which may in particular be non-transitory storage media. They may comprise respective programs, which in turn comprise respective program code (for instance a set of instructions).

It is to be noted that the circuitry formed by the components of apparatuses 11 and 12 may be implemented in hardware alone, partially in hardware and in software, or in software only.

As used in this text, the term 'circuitry' refers to any of the following:

(a) hardware-only circuit implementations (such as implementations in only analog and/or digital circuitry)

(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and (c) to circuits, such as a microprocessor(s) or a portion of a microprocessor(s), that require software or firmware for operation, even if the software or firmware is not physically present.

As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this specification, in particular but not limited to processors 111 and 121 of FIGS. 11 and 12, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Figure 13:
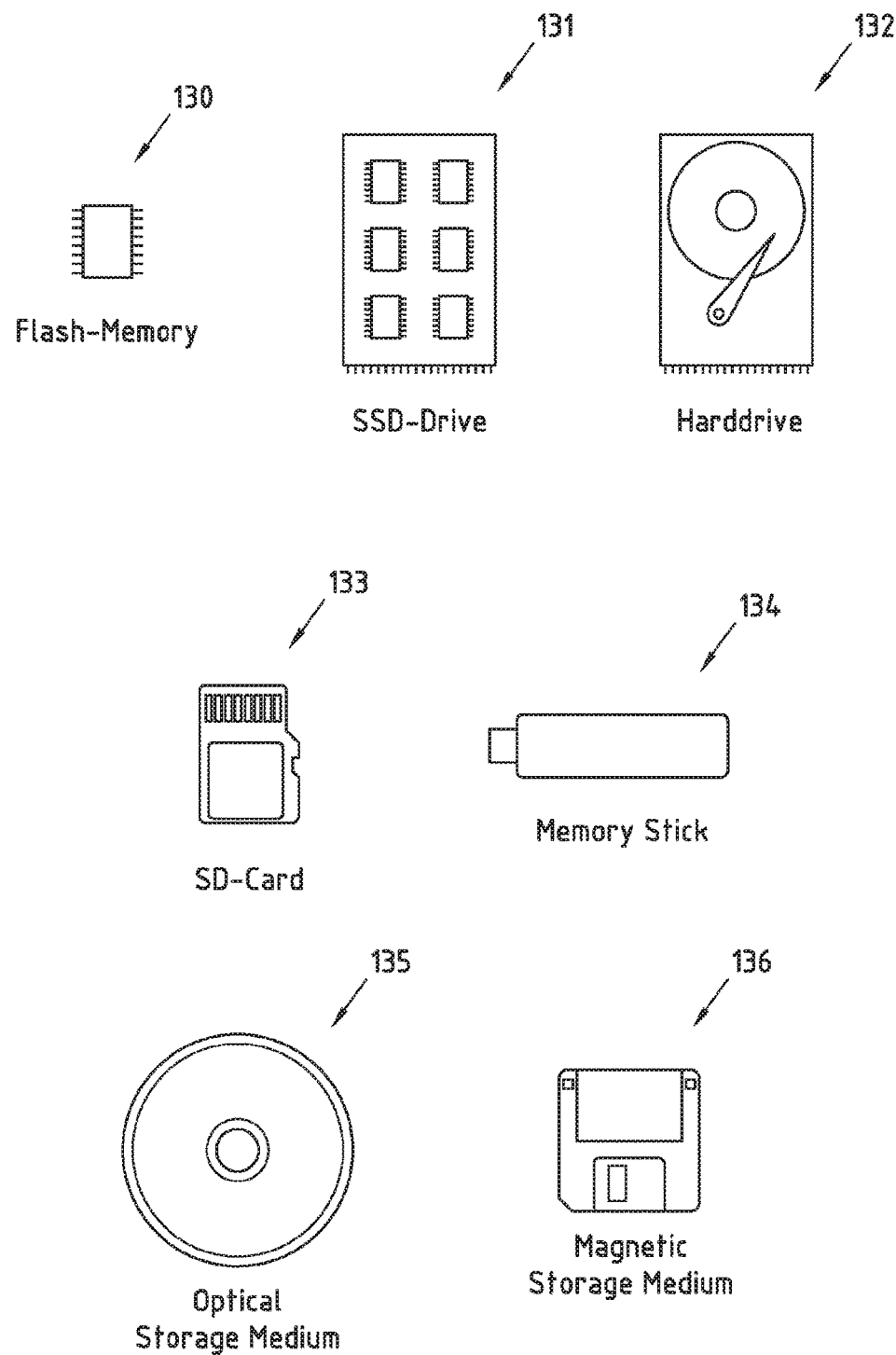
FIG. 13 is a schematic illustration of example embodiments of tangible storage media according to the present invention.

FIG. 13 illustrates examples of tangible storage media that may for instance be used to implement program memory 112 of FIG. 11 and/or program memory 122 of FIG. 12. To this end, FIG. 13 displays a flash memory 130, which may for instance be soldered or bonded to a printed circuit board, a solid-state drive 131 comprising a plurality of memory chips (e.g. Flash memory chips), a magnetic hard drive 32, a Secure Digital (SD) card 133, a Universal Serial Bus (USB) memory stick 134, an optical storage medium 135 (such as for instance a CD-ROM or DVD) and a magnetic storage medium 136.

Example embodiments of the present invention provide a 3D sectorized path-loss model, e.g. for indoor positioning. This model can for instance provide good accuracy for generic cases (e.g., when the topology of a building where positioning is to be performed is not known) since it treats the different directions of wave propagation differently, and can implicitly model the wave propagation across floors in vertical and horizontal directions (if enough measurements in that direction are available).

An advantage of the presented 3D modeling is that the path-loss and floor estimation can be done jointly. In a 3D model, there may be no need for a separate floor detection and a sub-sequent 2D path-loss model for in-floor positioning, since the 3D model offers all the needed information in one package. With a 3D path-loss model, the estimation of the position of the mobile terminal can be done directly in 3D, and the floor height can be implicitly deduced from there. Moreover, 3D path-loss modeling is likely to offer information also about the cases when the mobile terminal is in between floors (e.g., inside an elevator or on stairs), because the height or z-dimension is modeled as a continuous parameter similarly to x-y dimensions. This is a significant difference to 2D path-loss models, in which the height for the mobile terminal position is only allowed some discrete values, equal to floor heights, and this difference can prove beneficial to an all-encompassing mobile positioning. Moreover, a sectorized 3D path-loss modeling may intrinsically capture the floor attenuations, because the propagation model will be different along different 3D axes. This specification has disclosed an accurate and effective way of modeling the 3D path losses, e.g. in the indoor radio channel, and describes the parameters needed to be stored on the server or the client side.

Any presented connection in this specification is to be understood in a way that the involved components are operationally coupled. Thus, the connections can be direct or indirect with any number or combination of intervening elements, and there may be merely a functional relationship between the components.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. It will further be understood that any feature presented for an example embodiment in a particular category (method/apparatus/computer program) may also be used in a corresponding manner in an example embodiment of any other category. Finally, it should be understood that presence of a feature in the presented example embodiments shall not necessarily mean that this feature forms an essential feature of the invention and cannot be omitted or substituted.

The invention claimed is:

1. A method performed by at least one apparatus, the method comprising:

obtaining position information on a position of a device capable of determining or obtaining its current position and received signal strength information representative of a strength of a signal from a communication node receivable at said position;

generating or updating a 3D sectorized path-loss model associated with said communication node at least based on said position information of said device and said received signal strength information, wherein said position information and said received signal strength information are used to generate or update one or more path-loss parameters for a 3D sector of a set of at least two 3D sectors of said 3D sectorized path-loss model in which 3D sector said position is located.

2. The method according to claim 1, further comprising: obtaining identification information allowing to identify said communication node, wherein a plurality of communication nodes comprising said communication node exist, and wherein at least said position information and said received signal strength information are used for generating or updating only said 3D sectorized path-loss model for said communication node identified by said identification information.

3. The method according to claim 2, wherein said received signal strength information and said identification information are determined by said device and provided in a fingerprint.

4. The method according to claim 1, wherein respective position information and respective received signal strength information pertaining to a plurality of positions located in said 3D sector are used to generate or update said path-loss parameters for said 3D sector.

5. The method according to claim 4, wherein respective distances between said positions indicated by said respective position information and a position of said communication node are determined at least based on said respective position information pertaining to said positions and used together with said respective signal strength information of said positions to determine said path-loss parameters.

6. The method according to claim 5, wherein said respective distances between said positions indicated by said respective position information and said position of said communication node and said respective signal strength information of said positions are used as respective data pairs in a curve fitting process for determining said path-loss parameters.

7. The method according to claim 5, wherein said position of said communication node is estimated at least based on said respective position information and said respective received signal strength information pertaining to said plurality of positions located in said 3D sector.

8. The method according to claim 7, wherein said position of said communication node is estimated based on respective position information pertaining to a position for which respective received signal strength information indicates a largest received signal strength among said plurality of positions, or estimated as or based on an average of the positions indicated by said respective position information weighted with said respective received signal strength indicated by said respective signal strength information.

9. The method according to claim 1, wherein information on or derived from said 3D sectorized path-loss model is useable, together with received signal strength information representative of a strength of a signal received from said communication node by said device, in a process of determining an estimate of a position of said device.

10. A method performed by at least one apparatus, the method comprising:

at least one of storing, providing or obtaining information on or derived from a 3D sectorized path-loss model associated with a communication node by a server or by a mobile terminal, said 3D sectorized path-loss model comprising at least two 3D sectors with one or more respective path-loss parameters, said information on or derived from the 3D sectorized path-loss model useable, together with received signal strength information representative of a strength of a signal received from said communication node by a device, in a process of determining an estimate of a position of said device.

11. The method according to claim 10, comprising at least one of said obtaining and storing, and further comprising performing said process of determining said estimate of said position of said device, wherein in said process of determining an estimate of said position of said device, information on or derived from a 3D sectorized path-loss model associated with a further communication node is used together with received signal strength information representative of a strength of a signal received from said further communication node by said device.

12. The method according to claim 11, wherein the respective 3D sectorized path-loss models and/or the respective information on or derived from these 3D sectorized path-loss models for the different communication nodes are selected based on respective identification information allowing to respectively identify said different communication nodes, said respective identification information determined by said device.

13. The method according to claim 11, wherein in said process of determining an estimate of said position of said device, said received signal strength information and said information on or derived from said 3D sectorized path-loss model associated with said communication node is used to determine likelihood information expressing a likelihood that a position is said position of said device, wherein said received signal strength information representative of said strength of said signal received from said further communication node by said device and said information on or derived from said 3D sectorized path-loss model associated with said further communication node is used to determine further likelihood information expressing a likelihood that a position is said position of said device, and wherein both said likelihood information and said further likelihood information are jointly considered to obtain said estimate of said position of said device.

14. The method according to claim 13, wherein said likelihood information is determined for a plurality of predefined positions, or wherein said likelihood determined for a plurality of predefined positions and said further likelihood information is also determined for said plurality of predefined positions.

15. The method according to claim 14, wherein said plurality of predefined positions form a 3D grid, or form a 3D grid that is a grid with equidistant positions in at least one dimension.

16. The method according to claim 10, wherein said path-loss parameters are an assumed transmit power of said communication node and a path-loss coefficient that characterizes a steepness of a decay of said assumed transmit power with a logarithm of a distance towards the communication node, or are an assumed transmit power P0 of said communication node and a path-loss coefficient n of a path-loss model describing a received signal strength P in a distance d towards said communication node as P=P0−10·n·log (d).

17. The method according to claim 10, wherein said 3D sectors are 3D sphere sectors of a sphere having a position of said communication node at its center.

18. The method according to claim 17, wherein said 3D sectors are of conical form, wherein respective tops of said 3D sectors lye on said center of said sphere and wherein respective convex bases of said 3D sectors lye on a surface of said sphere.

19. The method according to claim 18, wherein respective ratios of an area of said respective convex bases and a total area of said surface of said sphere define respective sector widths of said 3D sectors, and wherein a position is considered to be located in a 3D sector of said 3D sectors if an Euclidean distance between said position and a center of said convex base of said 3D sector are smaller than or equal to 2 times a square root of said sector width.

20. An apparatus comprising:

at least one processor and at least one memory including computer program code, the at least one memory and the computer program code configured to, with the at least one processor, cause an apparatus at least to perform at least one of storing, providing or obtaining information on or derived from a 3D sectorized path-loss model associated with a communication node by a server or by a mobile terminal, said 3D sectorized path-loss model comprising at least two 3D sectors with one or more respective path-loss parameters, said information on or derived from the 3D sectorized path-loss model useable, together with received signal strength information representative of a strength of a signal received from said communication node by a device, in a process of determining an estimate of a position of said device.

* * * * *